(12) United States Patent
Lo

(10) Patent No.: US 11,001,101 B2
(45) Date of Patent: May 11, 2021

(54) INFLATABLE TUBELESS TIRE

(71) Applicant: CHENG SHIN RUBBER IND. CO., LTD., Chang-Hwa (TW)

(72) Inventor: Tsai Jen Lo, Chang-Hwa (TW)

(73) Assignee: Cheng Shin Rubber Industrial Co., Ltd., Tasuen (TW)

( * ) Notice: Subject to any disclaimer, the term of this patent is extended or adjusted under 35 U.S.C. 154(b) by 246 days.

(21) Appl. No.: 16/210,372

(22) Filed: Dec. 5, 2018

(65) Prior Publication Data

US 2019/0299716 A1 Oct. 3, 2019

(30) Foreign Application Priority Data

Mar. 29, 2018 (TW) ................................ 107110927

(51) Int. Cl.
| | |
|---|---|
| *B60C 5/12* | (2006.01) |
| *B60C 19/12* | (2006.01) |
| *B60C 5/14* | (2006.01) |
| *B60C 1/00* | (2006.01) |
| *B60C 5/16* | (2006.01) |
| *B60C 9/26* | (2006.01) |
| *C08L 7/00* | (2006.01) |

(52) U.S. Cl.
CPC ............ *B60C 5/142* (2013.01); *B60C 1/0008* (2013.01); *B60C 5/16* (2013.01); *B60C 9/26* (2013.01); *B60C 19/12* (2013.01); *B60C 19/125* (2013.01); *C08L 7/00* (2013.01)

(58) Field of Classification Search
CPC .... B60C 5/00; B60C 5/12; B60C 5/14; B60C 5/142; B60C 5/16; B60C 19/12; B60C 19/122; B60C 19/125; B60C 19/127
See application file for complete search history.

(56) References Cited

U.S. PATENT DOCUMENTS

| 1,089,913 | A | * | 3/1914 | Dittenhoefer | ............ B60C 5/20 |
| | | | | | 152/339.1 |
| 1,619,812 | A | * | 3/1927 | Develay | .................... B60C 5/20 |
| | | | | | 152/157 |

(Continued)

*Primary Examiner* — Justin R Fischer
(74) *Attorney, Agent, or Firm* — Rosenberg, Klein & Lee

(57) ABSTRACT

An inflatable tubeless tire includes a carcass, a bead at the lower edge of both sides of the carcass; a cladding layer, continuously covering the bead from the exterior to the interior of the carcass, and both ends of the cladding layer having an overlapped portion between each carcass and a tread and continuously extending to form an external covered portion for covering an area from the outer surface to the bead, and the portion of both sides of the cladding layer covering the interior of the carcass being an internal covered portion, and the uncovered position in the carcass being an elastic portion, and each inner surface in the carcass and the cladding layer jointly forming a gas chamber; at least a separator, partially disposed on a wall surface of the gas chamber for isolating each elastic portion and the inner surface without sticking to one another of the carcass; an air valve module, passing between each opening and the through hole, and having a film fixed to the elastic portion; and an extending part, passing through each film, the cladding layer and the separator; a screw, with an end screwed into the extending part; and the screw having an air valve part therein.

12 Claims, 12 Drawing Sheets

(56) References Cited

U.S. PATENT DOCUMENTS

| | | | |
|---|---|---|---|
| 5,746,850 A * | 5/1998 | Luscher | B60C 5/025 137/223 |
| 8,151,845 B2 * | 4/2012 | Merino-Lopez | B60C 19/002 152/331.1 |
| 2002/0040749 A1 * | 4/2002 | Liu | B60C 5/22 152/511 |

* cited by examiner

INFLATABLE TUBELESS TIRE

FIELD OF THE INVENTION

The present invention relates to a tubeless tire structure, and more particularly to the tire having a separator with an airtight structural design and a cladding layer to improve the air retention and the durability of the tire.

BACKGROUND OF THE INVENTION

Most tires are generally made of a rubber material and mounted onto a wheel rim. Since the tires are in direct contact with the ground, the rolling of the tires absorbs impact forces from the ground during driving, and the elasticity of the rubber material of the tires can buffer the forces between the ground and the wheel rim to improve the driver's and passengers' comfortability during driving effectively.

The structure of a tire is roughly comprised of a tread and a multiple of plies disposed therein, a flanged bead extended from a sidewall of the tire, and a bead core embedded into the interior of the bead. Wherein the tire includes clincher type and tubular type, the tubular tire means a section of a tire that is closed and has a closed tube shape that extends into a tire in a ring shape; the clincher tire refers to the tire with a cross-section substantially U-shaped and extended into a ring-shape and having a bead structure extended outwardly from two sidewalls of the tire, wherein the clincher tire includes tube type tire and tubeless tire, and the difference resides on whether or not there is a tube installed between the rim and the tire.

In the structure of the tubeless tire, the cross-sectional view shows that a space is formed between the tire and the rim, and no inner tube is found inside the space, but air is pumped into the space directly. The structure of the tubeless tire emphasizes on the effect of air retention. The main factor affecting the air retention is the outflow of air from a gap between the tire and rim, or when the tire is pierced. To minimize the loss of air from the gap between the rim and the tire, a high precision for the tight connection is required, so that the structural design of the bead and hook of rim sidewall is very important. If a tire is pierced and a leakage is resulted, immediate actions with a corresponding protection technology will be required.

When a conventional tubeless tire is flat or the carcass is pierced, an immediate protection is required, and a sealant or anti-puncture liquid is provided to fill the damaged part automatically. In general, the sealant is filled into a gas chamber formed and enclosed by the tire and the rim, but the sealant may flow in the gas chamber arbitrarily and leak through the connecting position of the air valve to contaminate the rim. Particularly, the sealant may stick onto the rim easily and cannot be cleaned easily, and thus making the installation difficult. Therefore, it is necessary to install an additional airtight lining to the rim, or install a special air valve to prevent air and sealant from flowing out from the gap of the rim.

To overcome the issue of airtightness between the rim and the tubeless tire, related manufacturers have developed various different air retention techniques such as an "airtight-plate technique" and an "isolation-layer technique", wherein the airtight-plate technique is a technique developed mainly for overcoming the issue of losing air from the gap between the rim and the tire, so that an airtight plate is installed inside the tire and fixed to a predetermined area by both two sidewalls of the carcass, and the airtight plate may move in the carcass. Such technique has been disclosed in TW Pat. No. M526964 entitled "Tire with a screw air valve". This tire comprises: a carcass, having a open-groove and two side edge portions disposed adjacent to the open-groove; an airtight plate, fixed to the two side edge portions of the carcass and forming and enclosing a gas chamber with the carcass, and the airtight plate having an inner surface facing the gas chamber, an outer surface facing the opposite direction of the inner surface, and an opening penetrating through the inner surface and the outer surface and communicating to the gas chamber; and an air valve, including an extending part and an external locking part, and the extending part having an inner stop portion disposed on the inner surface of the airtight plate, a screw extending from the inner stop portion and passing through the opening of the airtight plate, and an inflating channel penetrating through the inner stop portion and the screw and communicating to the gas chamber, and the external locking part being screwed and sheathed on the screw and directly or indirectly abutting at the outer surface of the airtight plate.

The isolation-layer technique is a protection technique designed for protecting the tire when the tire is pierced and a leakage is resulted. In this technique, an isolation layer is added to the interior of the carcass at the position of the tread, or an isolation layer has a space therein, and a puncture sealant or an anti-puncture liquid is filled into the space of the isolation layer. Such technology has been disclosed in TW Public. No. 335769 entitled "Tube type tire with a sealant". This tire comprises a tire body and an inner tube filled with a sealant and installed into an internal space of the tire body, and an air valve of the inner tube has a seal component for sealing the gap between the air valve and the rim. In addition, the left and right bead portions of the tire body facing the opening portion of the tire abut against the left and right edge of the wheel and sealed altogether. Further, the inner tube filled with the sealant has an air chamber formed therein and filled with air and a sealant chamber formed at the internal periphery and filled with a sealant.

The aforementioned structures adopt the tubeless tire technique with the air retention effect, wherein the first patented technique adds an airtight plate at the side edge portion of the carcass, so that the internal periphery of the carcass and the airtight plate jointly form a chamber for filling air, and an air valve module is installed to the airtight plate to prevent the air valve from being loosened or unscrewed, and the external locking part is screwed and sheathed on the screw to directly or indirectly press the outer surface of the airtight plate. In the second patented technique, a chamber filled with a sealant is added at the internal periphery of the carcass and disposed opposite to the tread to overcome the issue of contaminating the rim.

However, the first patented carcass is just single-layered, so that the whole tire has poor rigidity and support, and the air valve structure has an inner stop portion (which is an end of the extending part), so that after the extending part is passed out of the airtight plate, a spacer or a spring washer is used to abut the other side with the inner stop portion. However, such pressing design may produce an elastic fatigue easily at the pressing position of the airtight plate, and air may leak from the gap of the extending part. Meanwhile, the first patented airtight plate is just fixed to the inner walls of the beads on both sides, so that the covering area is small, and a leakage may occur at the connecting position after a long time of use. In addition, the first patented air valve is a specially designed air valve incompatible with the general standard air valves, and thus incurring high manufacturing and maintenance costs.

SUMMARY OF THE INVENTION

In view of the aforementioned drawbacks of the conventional airtight-plate tubeless tire, the inventor of the present invention provides a tubeless technology capable of improving the air retention effect and durability of the tire.

This invention discloses an inflatable tubeless tire comprising: a carcass, with an U-shaped cross-section, and a bead disposed on the lower edge of both sides of the carcass respectively, an inner surface and an outer surface disposed at the interior and exterior of the carcass respectively, and a tread disposed at a predetermined position of the outer surface of the carcass; a cladding layer, continuously covering an area from the outer surface to the inner surface, and having an overlapped portion disposed within a predetermined range of both ends of the cladding layer, and the overlapped portion being disposed between each carcass and the tread and continuously extending to form an external covered portion for covering an area from the outer surface to the bead, and the positions of both sides of the cladding layer covering the inner surface being an internal covered portion, and the uncovered position in the carcass being an elastic portion, and an opening being formed at a default position and penetrating through the elastic portion, and a gas chamber being jointly formed by each inner surface and a cladding layer inside the carcass; at least a separator, with a predetermined area partially disposed on the wall surface of the gas chamber, for separating the corresponding surfaces of each elastic portion and the inner surface without sticking to one another, and the separator having a through hole configured to be corresponsive to the opening; an air valve module, passing between each opening and the through hole, and having a film fixed onto the elastic portion; an extending part, passing through each film, the cladding layer and the separator; a screw, with an end screwed into the extending part; and the screw having an air valve part therein; and a locking part, screwed to the exterior of the screw and then screwed and positioned to a rim after the screw passes through the rim.

With the aforementioned components, the structural design of the cladding layer together with the installation of the separator can enhance the rigidity and support of the tire to improve the durability and safety. After the sulfuration process, a gas chamber is formed to improve the air retention effectively. In addition, the invention is compatible and applicable to the commercially available rims and air valve modules and capable of reducing the occurrence of elastic fatigue and leakage and improving the service life of the tire.

Therefore, it is a primary objective of this invention to provide an inflatable tubeless tire with a structural design of a cladding layer covering an area from the exterior to the interior of the carcass, while covering the bead, so as to enhance the rigidity and support of the tire and improve the durability and safety of the tire.

Another objective of this invention is to provide an inflatable tubeless tire having a gas chamber jointly formed by the cladding layer in the carcass, a separator disposed at a predetermined position of the wall of the chamber, so that the cladding layer will not stick to the inner wall of the carcass. In addition, after the sulfuration process, a gas chamber is formed to improve the air retention of the tire effectively.

A further objective of this invention is to provide an inflatable tubeless tire installable to a general rim without the need of installing an airtight lining onto the wheel rim, so that the invention has a high degree of compatibility.

Another objective of this invention is to provide an inflatable tubeless tire having an extending part passing through each film, the cladding layer and the separator, and a screw is screwed and fixed into the extending part, and each film, the cladding layer and the separator can minimize the elastic fatigue when not being pressed, so as to reduce the occurrence of leakage and extend the service life of the tire, and the tire of the invention is compatible with the commercially available standard air valve module.

This invention discloses an inflatable tubeless tire comprising: a carcass, with an U-shaped cross-section, and a bead disposed on the lower edge of both sides of the carcass respectively, an inner surface and an outer surface disposed at the interior and exterior of the carcass respectively, and a tread disposed at a predetermined position of the outer surface of the carcass; a cladding layer, continuously covering an area from the outer surface to the inner surface, and having an overlapped portion disposed within a predetermined range of both ends of the cladding layer, and the overlapped portion being disposed between each carcass and the tread and continuously extending to form an external covered portion for covering an area from the outer surface to the bead, and the positions of both sides of the cladding layer covering the inner surface being an internal covered portion, and the uncovered position in the carcass being an elastic portion, and an opening being formed at a default position and penetrating through the elastic portion, and a gas chamber being jointly formed by each inner surface and a cladding layer inside the carcass; at least a separator, with a predetermined area partially disposed on the wall surface of the gas chamber, for separating the corresponding surfaces of each elastic portion and the inner surface without sticking to one another, and the separator having a through hole configured to be corresponsive to the opening; an air valve module, passing between each opening and the through hole, and having a film fixed onto the elastic portion; an extending part, passing through each film, the opening and the through hole; a screw, with an end screwed into the extending part; and the screw having an air valve part therein; and a locking part, screwed to the exterior of the screw and then screwed and positioned to a rim after the screw passes through the rim.

Wherein, the separator may be a single-piece spacer, a multiple-piece spacer, an isolation liquid, or an isolation powder.

Wherein, the separator is installed on a wall surface of the gas chamber by fixing, coating, or both of the fixing and coating.

Wherein, the elastic portion has an inner wall facing an edge surface of the gas chamber; an outer wall disposed on the other side of the elastic portion; and the separator is installed on the inner wall.

Wherein, the separator is disposed on the elastic portion, the inner surface, or simultaneously installed onto each elastic portion and each inner surface.

Wherein, the separator is sheet-shaped and made of a material such as vinyl chloride, polyethylene terephthalate, acrylonitrile butadiene styrene, polyethylene, polypropylene, low-density styrene, polystyrene, polyethylene terephthalate, polyamide, polyoxymethylene, polycarbonate, polyphenylene ether, ethylene vinyl acetate, polyimide, polyphenylene sulfide, or polytetrafluoroethylene.

Wherein, the separator is in a powder form, and made of a material selected from the group consisting of silicone and magnesium oxide.

Wherein, the separator is in a liquid form which is a silicone-containing solvent.

Wherein, the separator has an arc length greater than or equal to ⅓ of the arc length of the inner surface of the carcass.

Wherein, the separator has an arc length smaller than or equal to 1.5 times of the arc length of the inner surface of the carcass.

Wherein, the cladding layer is a high-strength carcass layer material; the extending part is in a hollow tubular shape having a screw thread therein; and an end of the screw is screwed into the screw thread; and the extending part has a length value falling within a range of 2 mm~15 mm.

DESCRIPTION OF THE PREFERRED EMBODIMENTS

Figure 1:
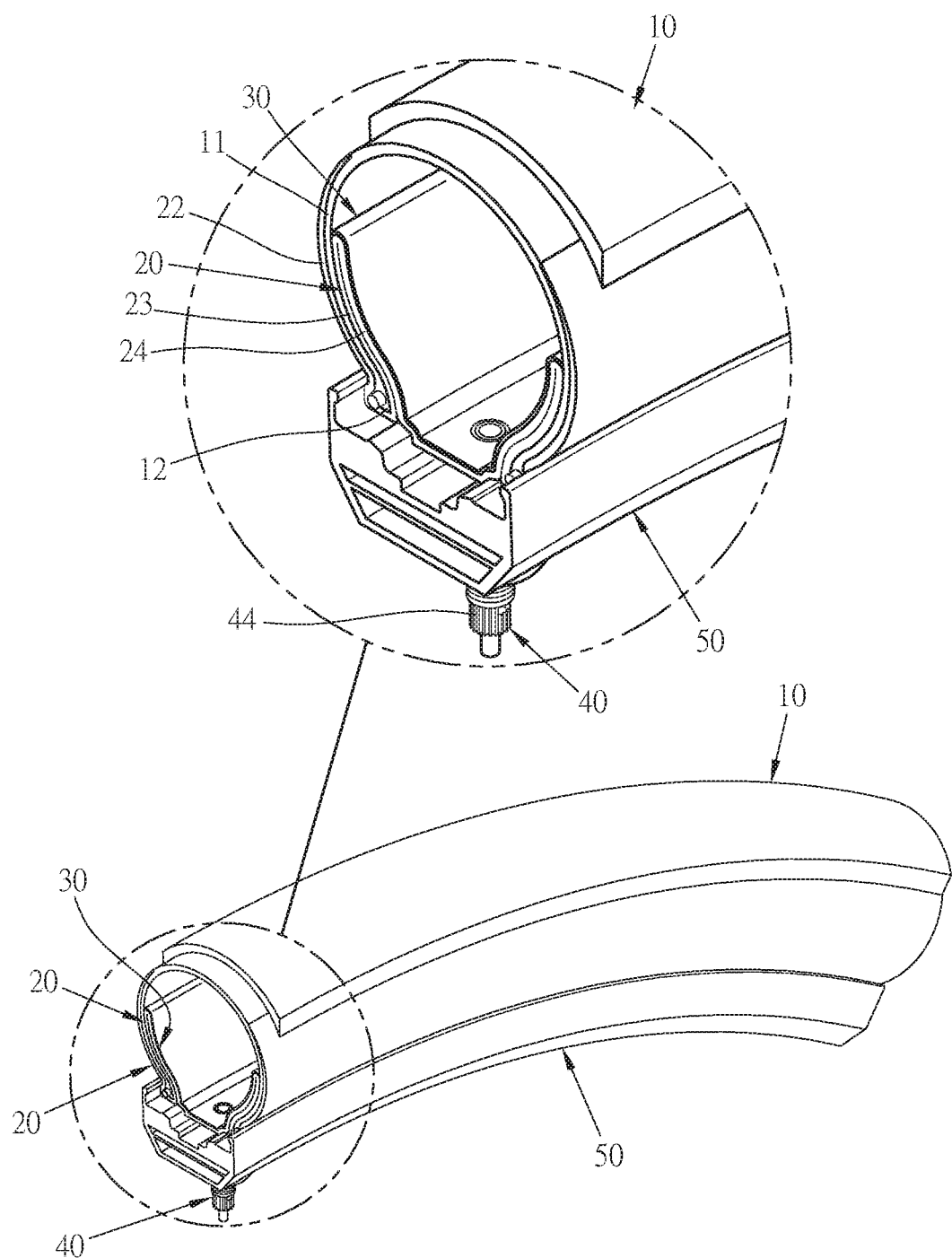
FIG. 1 is a perspective view of an inflatable tubeless tire in accordance with a first preferred embodiment of the present invention.

The technical characteristics, contents, advantages and effects of the present invention will be apparent with the detailed description of a preferred embodiment accompanied with related drawings as follows. The drawings are provided for the illustration, and same numerals are used to represent respective elements in the preferred embodiments. It is intended that the embodiments and drawings disclosed herein are to be considered illustrative rather than restrictive. Same numerals are used for representing same respective elements in the drawings.

Figure 2:
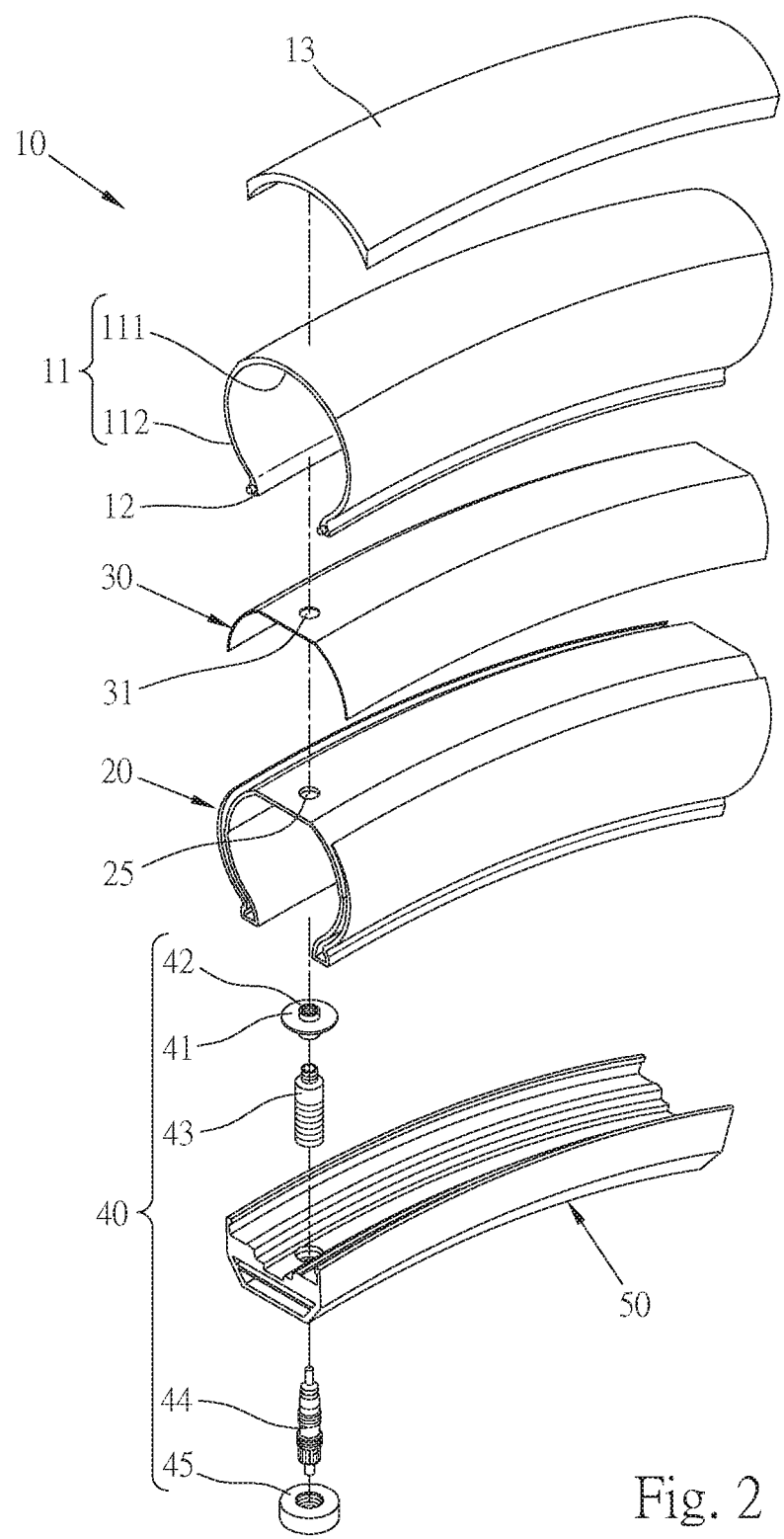
FIG. 2 is an exploded view of an inflatable tubeless tire in accordance with the first preferred embodiment of the present invention.
Figure 3:
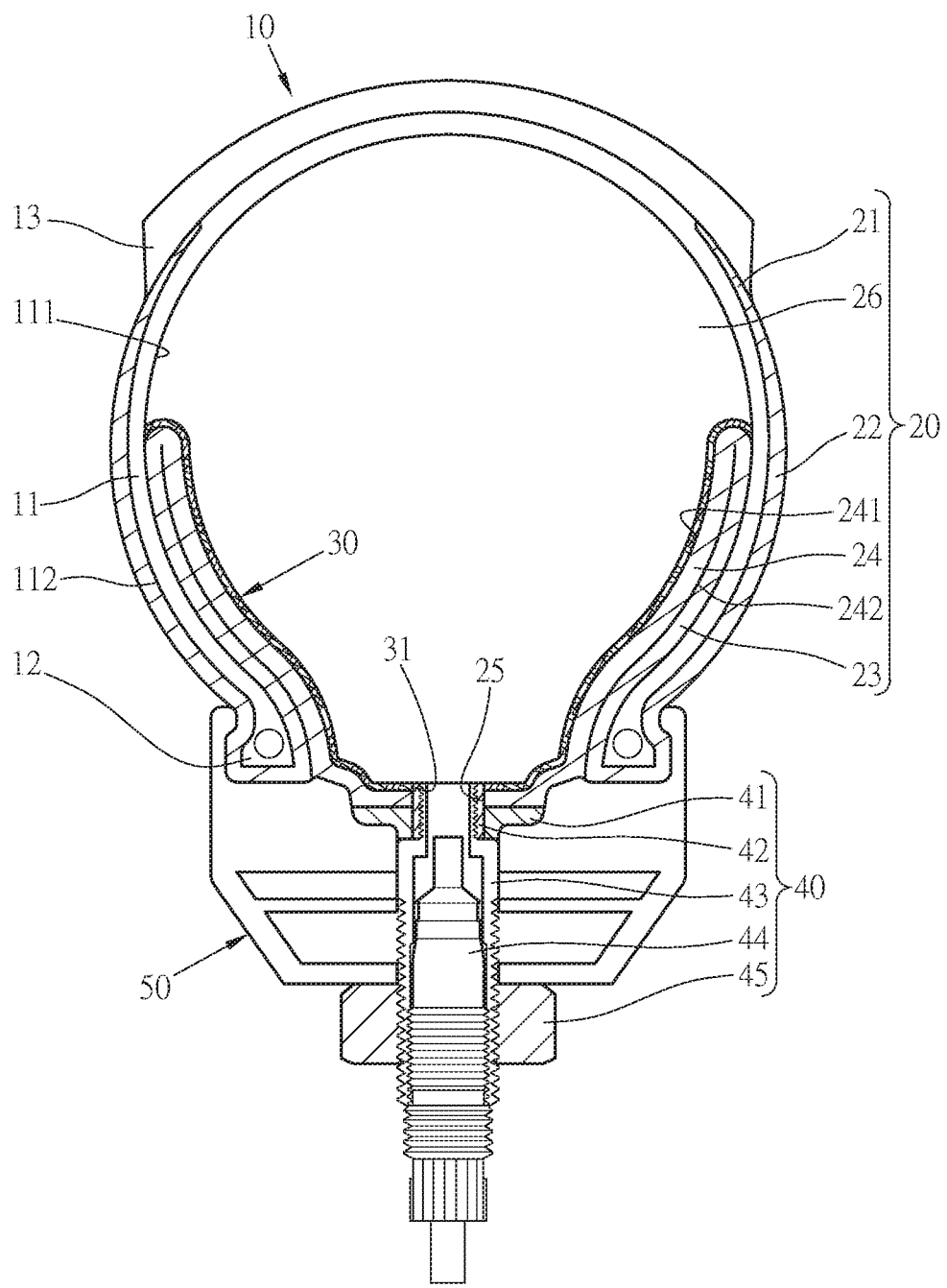
FIG. 3 is a schematic view of an assembly of an inflatable tubeless tire in accordance with the first preferred embodiment of the present invention.

With reference to FIGS. 1 to 3 for an inflatable tubeless tire in accordance with the present invention, the inflatable tubeless tire 10 comprises a carcass 11, a cladding layer 20, at least a separator 30 and an air valve module 40.

The tire 10 has a carcass 11 with a U-shaped cross-section, and a bead 12 formed at the lower edge on both sides of the carcass 11. The interior and exterior of the carcass 11 have an inner surface 111 and an outer surface 112 respectively. The outer surface 112 has a tread 13 disposed at a predetermined position of the outer surface 112.

The cladding layer 20 is made of a carcass layer material with a high strength and provided for covering an area from the outer surface 112 to the inner surface 111 continuously, and an overlapped portion 21 is disposed within a predetermined range of both ends of the cladding layer 20 and between each carcass 11 and the tread 13. The overlapped portion 21 has a continuously extended external covered portion 22 for covering an area from the outer surface 112 to the bead 12. The portion of both sides of the cladding layer 20 covering the inner surface 111 is an internal covered portion 23, and the uncovered portion disposed in the carcass 11 is an elastic portion 24. An opening 25 is penetrated and formed at a default position of the elastic portion 24, a gas chamber 26 is jointly formed by each inner surface 111 in the carcass 11 and the cladding layer 20; an edge surface of the elastic portion 24 facing the gas chamber 26 is an inner wall 241; and the other side surface of the elastic portion 24 is an outer wall 242.

The separator 30 is partially disposed at a predetermined area on a wall surface of the gas chamber 26 for isolating the surface of each elastic portion 24 and the inner surface 111 without sticking to one another. In this preferred embodiment, the separator 30 is installed on an inner wall 241 of the elastic portion 24, and the separator 30 has a through hole 31 configured to be corresponsive to the opening 25.

The air valve module 40 is passed between each opening 25 and the through hole 31 and comprises a film 41 fixed to the elastic portion 24; an extending part 42, passing through each film 41, the opening 25 and the through hole 31, wherein the extending part 42 has a length falling within a range of 2 mm~15 mm; a screw 43, with an end screwed into the extending part 42; an air valve part 44 installed to the interior of the screw 43; a locking part 45, screwed to the exterior of the screw 43 and screwed and positioned to a rim 50 by the locking part 45 after the screw 43 is passed through the rim 50.

With the aforementioned components, the structural design of the cladding layer 20 together with the installation of the separator 30 can enhance the rigidity and support of the tire to improve the durability and safety. After the sulfuration process, a gas chamber 26 is formed to improve the air retention effectively. In addition, the invention is compatible and applicable to the commercially available rims and air valve modules and capable of reducing the occurrence of elastic fatigue and leakage and improving the service life of the tire. The invention is useful and cost-effective.

To make it easier for our examiner to understand the structural feature, technical means, and expected effects of this invention, the method of using the invention is described below:

In this invention, the cladding layer 20 is provided for covering an area from the outer surface 112 of the carcass 11 to the bead 12, and further covering the inner surface 111 of the carcass 11, wherein the cladding layer 20 may be divided into the following four portions according to the covering position and status: and these four portions are an overlapped portion 21, an external covered portion 22, an internal covered portion 23 and an elastic portion 24, wherein the overlapped portion 21 is overlapped and disposed between each tread 13 and the outer surface 112 of the carcass 11; the external covered portion 22 covers the portions of each outer surface 112 and bead 12; the internal covered portion 23 covers the portion of the inner surface 111 of the carcass 11; and the elastic portion 24 is disposed at the uncovered portion of the inner wall inside the carcass 11. Each elastic portion 24 and the inner wall of the carcass 11 jointly form the gas chamber 26, and the elastic portion 24 may be moved by a different inflated status, so that the gas chamber 26 may have different sizes of the space.

In this invention, the separator 30 may be a single-piece spacer, a multiple-piece spacer, an isolation liquid, or an isolation powder. When the separator 30 is in form of a sheet, it may be made of vinyl chloride, polyethylene terephthalate, acrylonitrile butadiene styrene, polyethylene, polypropylene, low-density styrene, polystyrene, polyethylene terephthalate, polyamide, polyoxymethylene, polycarbonate, polyphenylene ether, ethylene vinyl acetate, polyimide, polyphenylene sulfide or polytetrafluoroethylene. When the separator 30 is in form of a powder, it may be made of silicone or magnesium oxide. When the separator 30 is in form of a liquid, it may be a silicone-containing (siliconee) solvent.

In this invention, the separator 30 is installed and connected by fixing, coating, or both of the fixing and coating. The separator 30 is installed on the wall surface of the gas chamber 26 and may be disposed at the elastic portion 24, or the inner surface 111, or disposed at each elastic portion 24 and the inner surface 111 simultaneously. In this preferred embodiment of the present invention, the separator 30 is a single-piece spacer fixed to a surface of the elastic portion 24. Further, the separator 30 of this invention has an arc length greater than or equal to 1/5 of the arc length of the inner surface 111 of the carcass 11 or smaller than or equal to 1.5 times of the arc length of the inner surface 111 of the carcass 11.

Before the air valve module 40 of this invention is assembled, the extending part 42 is passed through each film 41, the cladding layer 20 and the separator 30 first, and then a sulfuration process is carried out, so that the extending part 42 is fixed into each opening 25, the through hole 31 and the film 41. When the air valve module 40 is assembled, the air valve part 44 are assembled into the screw 43, and an end of the assembled screw 43 is screwed into the extending part 42 to complete the assembling process.

Figure 4:
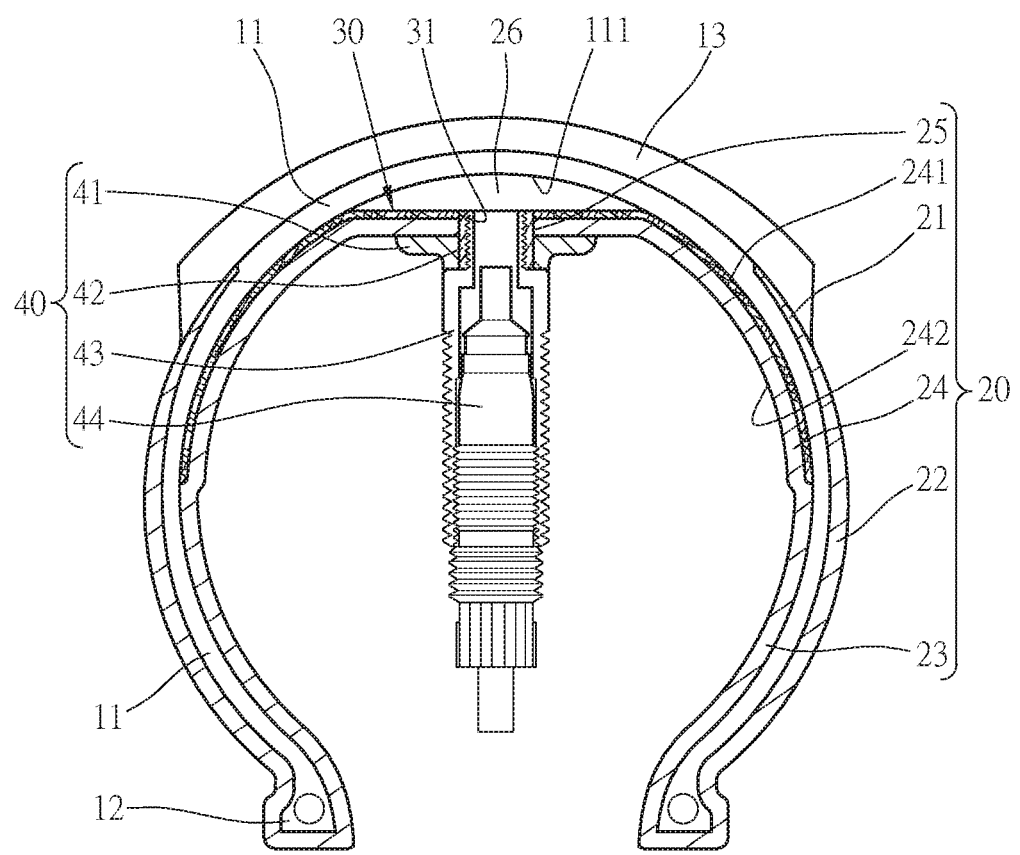
FIG. 4 is a schematic view of an inflatable tubeless tire in accordance with the first preferred embodiment of the present invention in a stored status.
Figure 5:
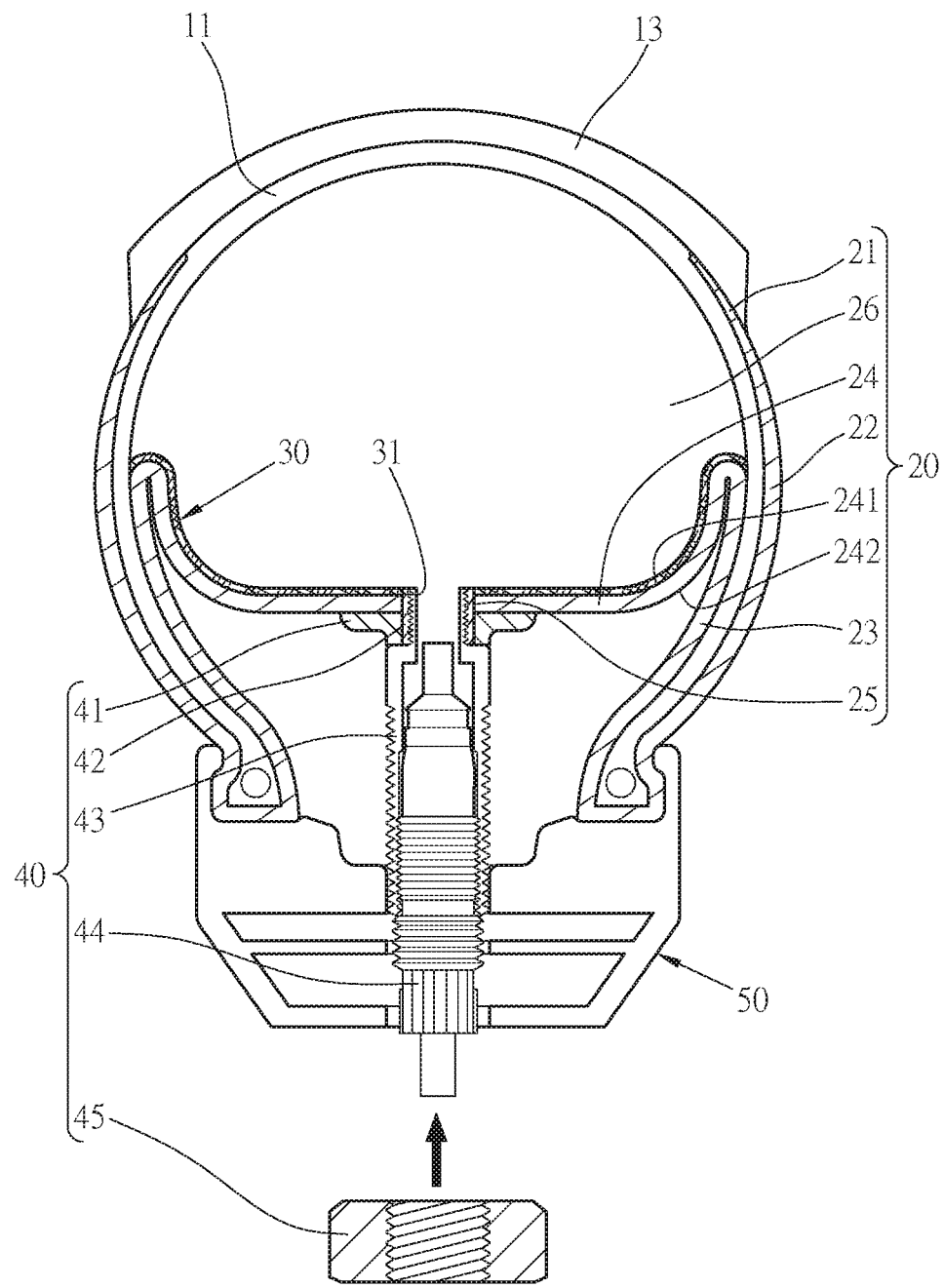
FIG. 5 is a schematic view of an inflatable tubeless tire in accordance with the first preferred embodiment of the present invention in an inflated status.

With reference to FIG. 4 for a general stored status of the tire of this invention, if the tire of this invention is not mounted onto the rim 50, each air valve module 40 and the elastic portion 24 will be accommodated in the carcass 11. Now, the gas chamber 26 is smaller. If the tire 10 of this invention is mounted onto the rim as shown in FIG. 5, each bead 12 on both sides will be embedded into a groove of the rim 50. When it is necessary to expose the air valve module 40 from the inner periphery of the rim 50, an internal pressure is applied to move each separator 30, the cladding layer 20 and the air valve module 40 in the carcass 11 towards the rim 50. After the air valve module 40 passes through the rim 50 as shown in FIG. 3, the air valve module 40 will be exposed form the inner periphery of the rim 50, and then the locking part 45 is sheathed on the screw to complete the assembling process.

When the tire of this invention is inflated, an air valve adapter of an air pump is set onto the air valve part 44 to start inflating the tire. Since air enters into the gas chamber 26, each separator 30, the cladding layer 20 and the air valve module 40 are moved towards the rim 50, and the space of the gas chamber 26 becomes larger until the air in the gas chamber 26 is saturated, so as to complete the process of inflating the tire.

Figure 6:
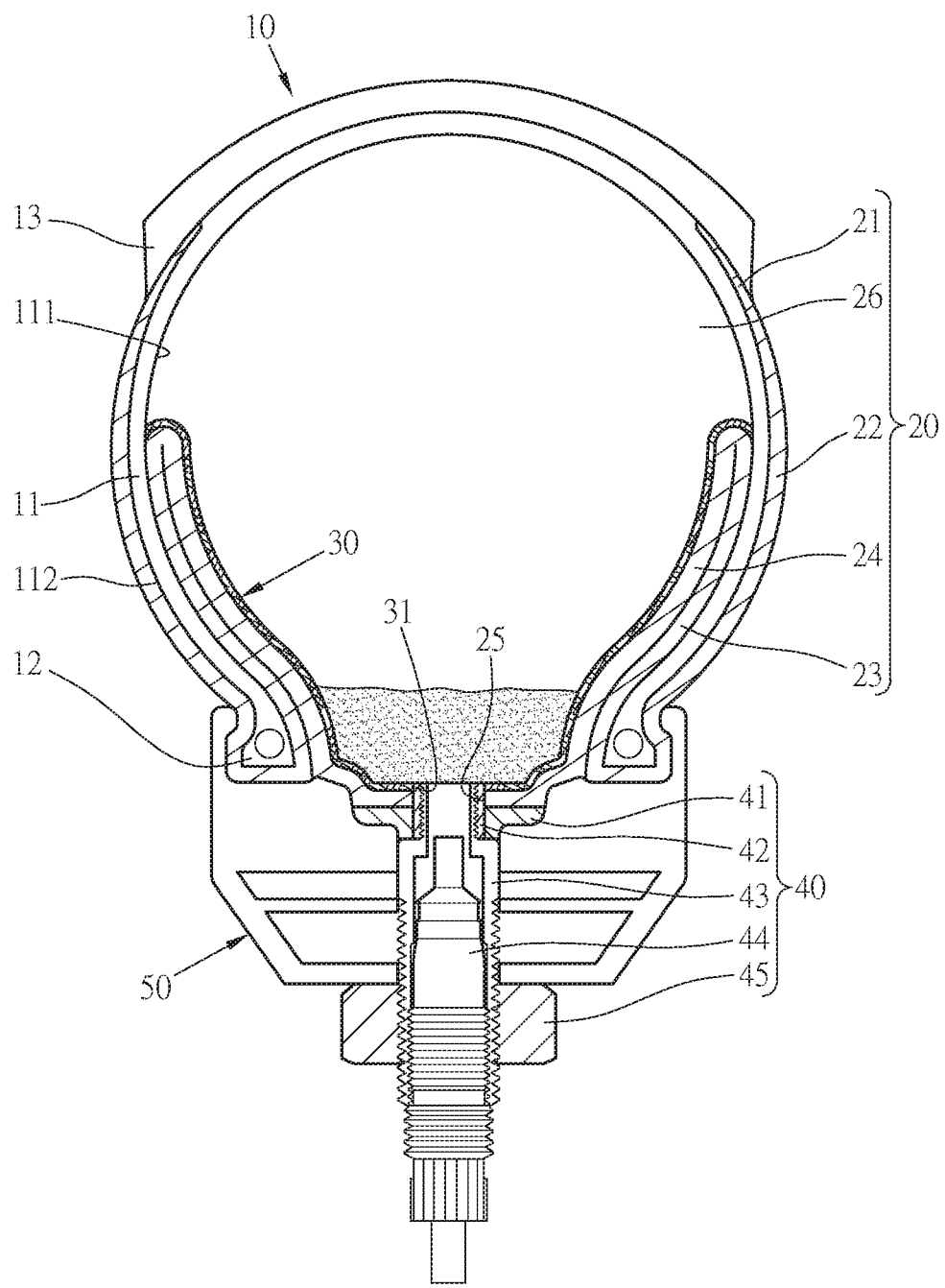
FIG. 6 is a first schematic view of an inflatable tubeless tire in accordance with the first preferred embodiment of the present invention filled with an anti-puncture liquid.
Figure 7:
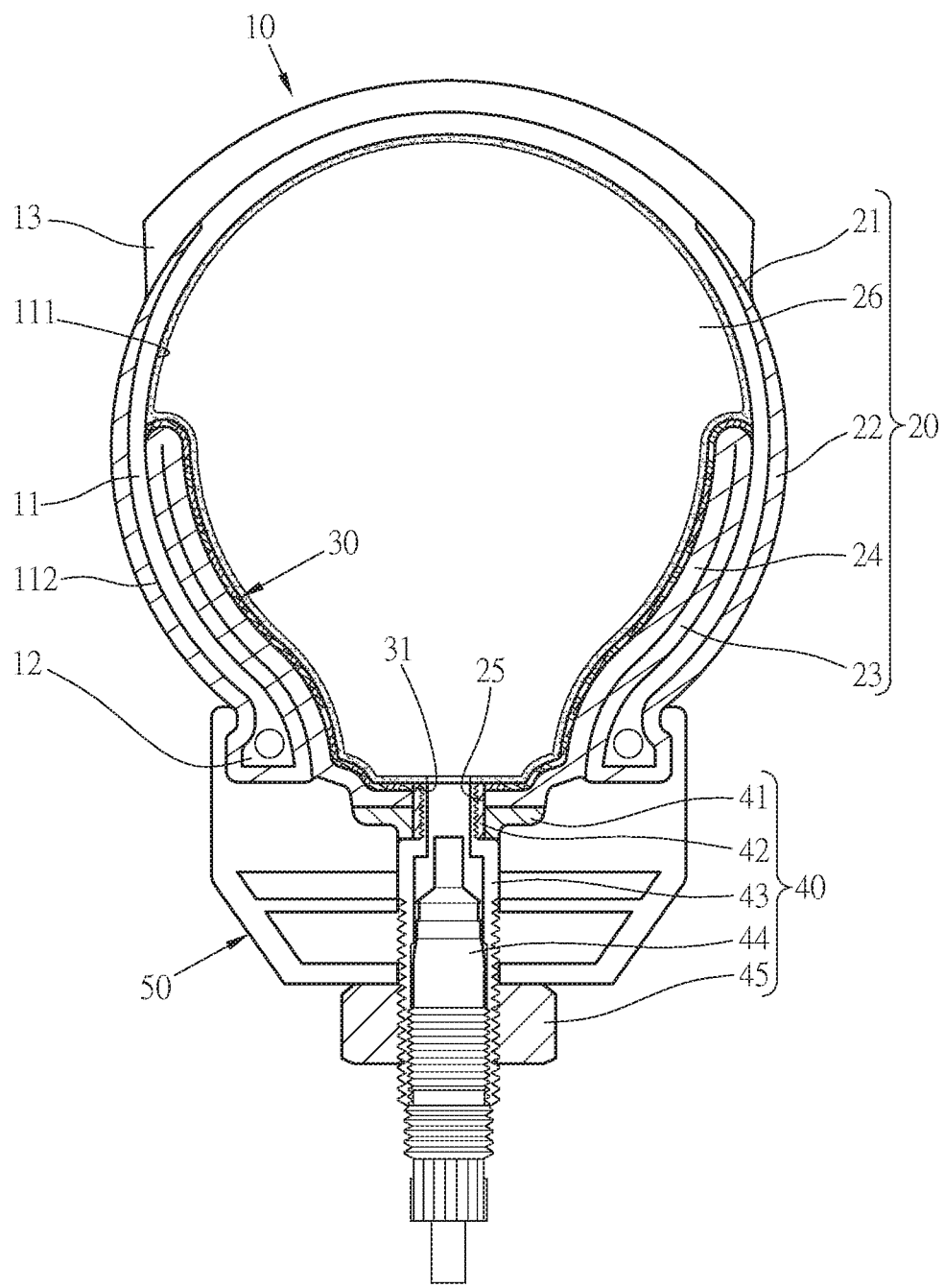
FIG. 7 is a second schematic view of an inflatable tubeless tire in accordance with the first preferred embodiment of the present invention filled with an anti-puncture liquid.

When the tire of this invention is filled with an anti-puncture liquid or a sealant as shown in FIG. 6, the gas chamber 26 is filled with a predetermined amount of anti-puncture liquid, so that the anti-puncture liquid will flow freely in the gas chamber 26. When the wheels of a motor vehicle starts running as shown in FIG. 7, the anti-puncture liquid will be attached uniformly onto the inner surface 111 of the carcass 11 or the surface of the separator 30 due to centrifugal force.

In the tire of this invention, the cladding layer 20 and separator 30 added into the carcass 11 and the design of the air valve module 40 can achieve the following effects:

1. The cladding layer 20 of this invention tire uses an integral covering method to cover a partially overlapped portion of each carcass 11 and the tread 13 starting from the outer surface 112 to the bead 12, and then from the bead 12 to the inner surface 111 of the carcass 11 continuously. In addition, the cladding layer 20 is made of a high-strength carcass layer material, so that the rigidity and support of the tire are enhanced.

2. When the cladding layer 20 covers to an area inside the carcass 11, the elastic portion 24 will be at an uncovered status, and each carcass 11 and the elastic portion 24 jointly form the sealed gas chamber 26. In addition, the installation of the separator 30 at a predetermined position of the inner wall of the carcass 11 can improve the air retention of the tubeless tire substantially. Compared with the general tubeless tire technology, the air retention of the tire in accordance with this invention tire can be improved by approximately 60%.

3. The cladding layer 20 covers each outer surface 112, the bead 12 and the inner surface 111 continuously by an integral covering method to achieve the effects of increasing the covering area between each cladding layer 20 and the inner surface 111 of the carcass 11, reducing the occurrence of the gap and leakage, providing a better airtightness, and overcoming the issue of having a leakage at the connecting position of the airtight plate.

4. The technique of covering the exterior and interior of the carcass 11 by the cladding layer 20 can improve the safety rate of the tire significantly. Compared with the general tubeless tires, the tire of this invention tire improves the safety by approximately 50%.

5. The cladding layer 20 with the overlapped portion 21 can be embedded between each carcass 11 and the tread 13 to strengthen the combination of the cladding layer 20, each carcass 11, and the tread 13, so as to improve the durability of the tire.

6. At least a separator 30 is installed at a predetermined position of the inner wall of the gas chamber 26, so that the cladding layer 20 will not stick to the inner wall of the carcass 11. In the meantime, the gas chamber 26 is formed successfully after the sulfuration process.

7. In the tire of this invention, the tubular extending part 42 is passed between each separator 30, the cladding layer 20 and the film 41, and then the screw 43 is screwed with the extending part 42, and such structural design can reduce the force applied to each film 41, cladding layer 20 and separator 30 for a long time or prevent the elastic fatigue caused by pressing, so as to reduce the occurrence of leakage and extend the service life of the tire.

8. The air valve part 44 is applicable to the specification of standard air valves commercially available in the market and installed into the screw 43, so that the invention is component compatible and capable of lowering the manufacturing and maintenance costs.

9. The tire of this invention is installable to a general rim without requiring an additional airtight lining, so that the invention has a high compatibility to lower the manufacturing and maintenance costs.

Figure 8:
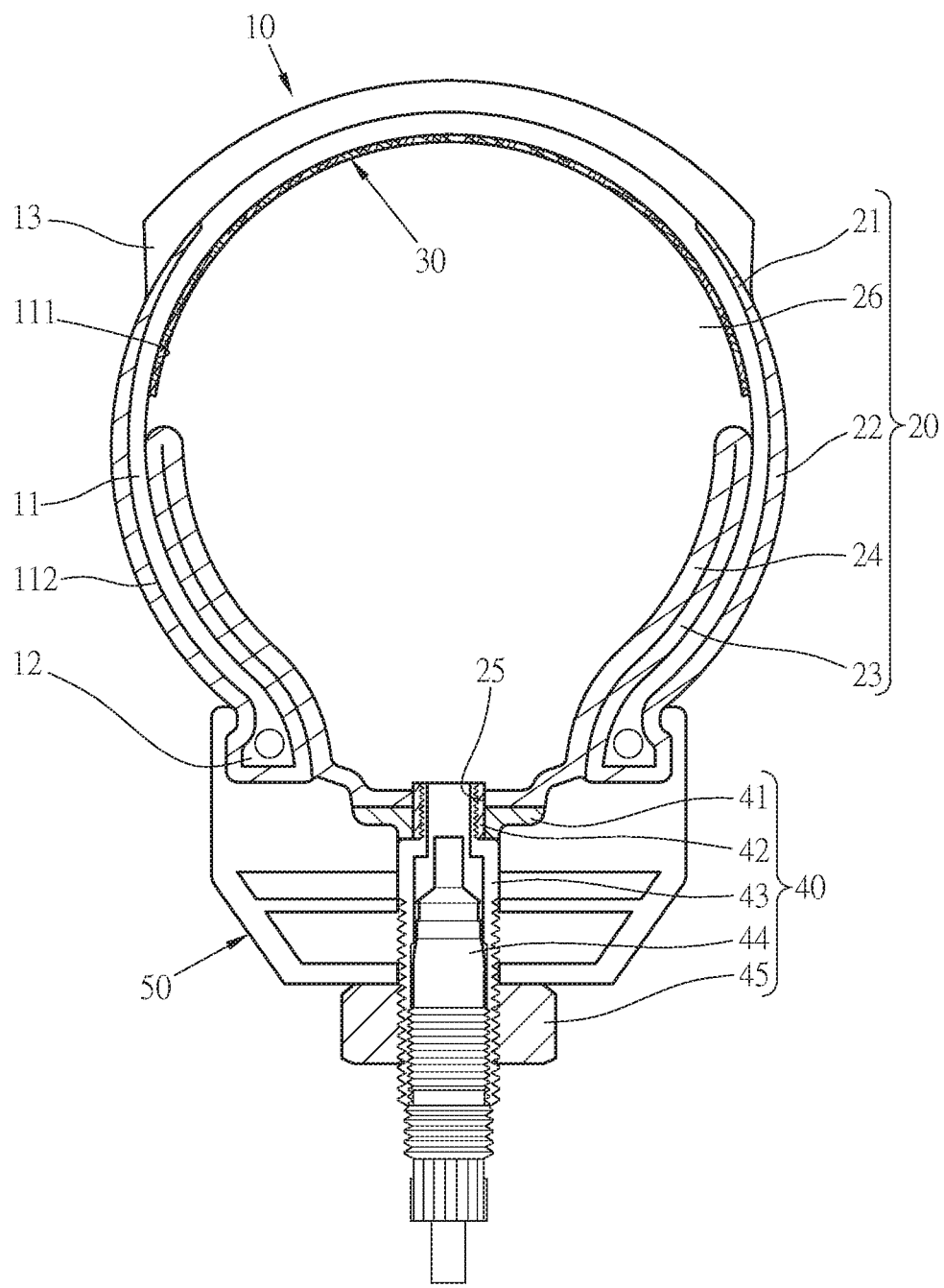
FIG. 8 is a schematic view of an assembly of an inflatable tubeless tire in accordance with a second preferred embodiment of the present invention.

With reference to FIG. 8 for a tire in accordance with the second preferred embodiment of this invention, the separator 30 is installed at the top of the gas chamber 26 (which is the position of the inner surface 111 opposite to the tread 13). The manufacturing method, assembling method, assembly and disassembly statuses and expected effects of this preferred embodiment are the same as those of the first preferred embodiment, except that the separator 30 of this embodiment is installed at a different position.

Figure 9:
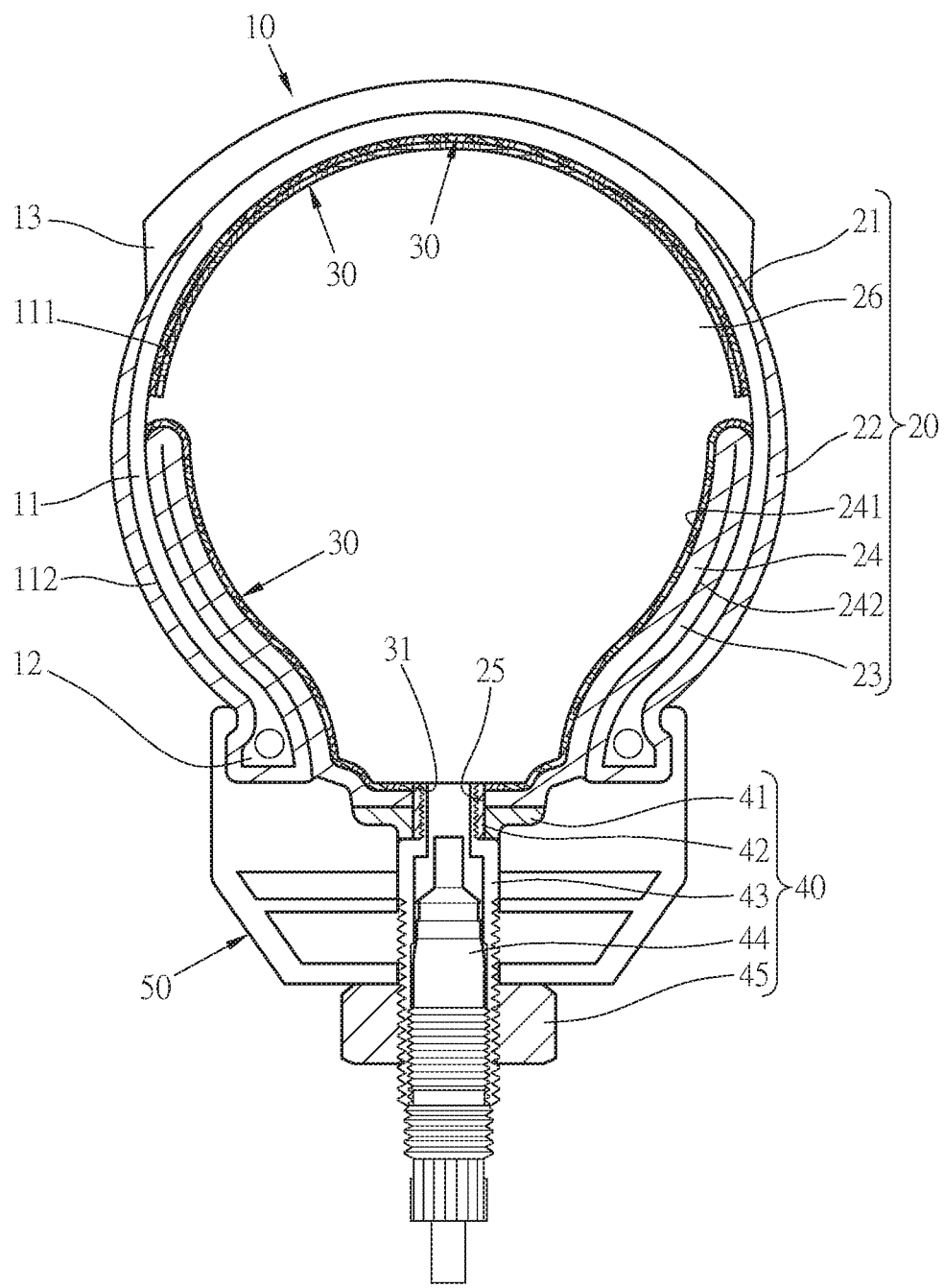
FIG. 9 is a schematic view of an assembly of an inflatable tubeless tire in accordance with a third preferred embodiment of the present invention.

With reference to FIG. 9 for a tire in accordance with the third preferred embodiment of this invention, the separator 30 is installed on an inner wall 241 of the elastic portion 24 and the top of the gas chamber 26 which is a position of the inner surface 111 corresponsive to the tread 13), and two layers are adopted. The manufacturing method, assembling method, assembly and disassembly statuses and expected effects of this preferred embodiment are the same as those of the first preferred embodiment, except that the separator 30 of this embodiment is installed at a different position and a plurality of separators 30 is used.

Figure 10:
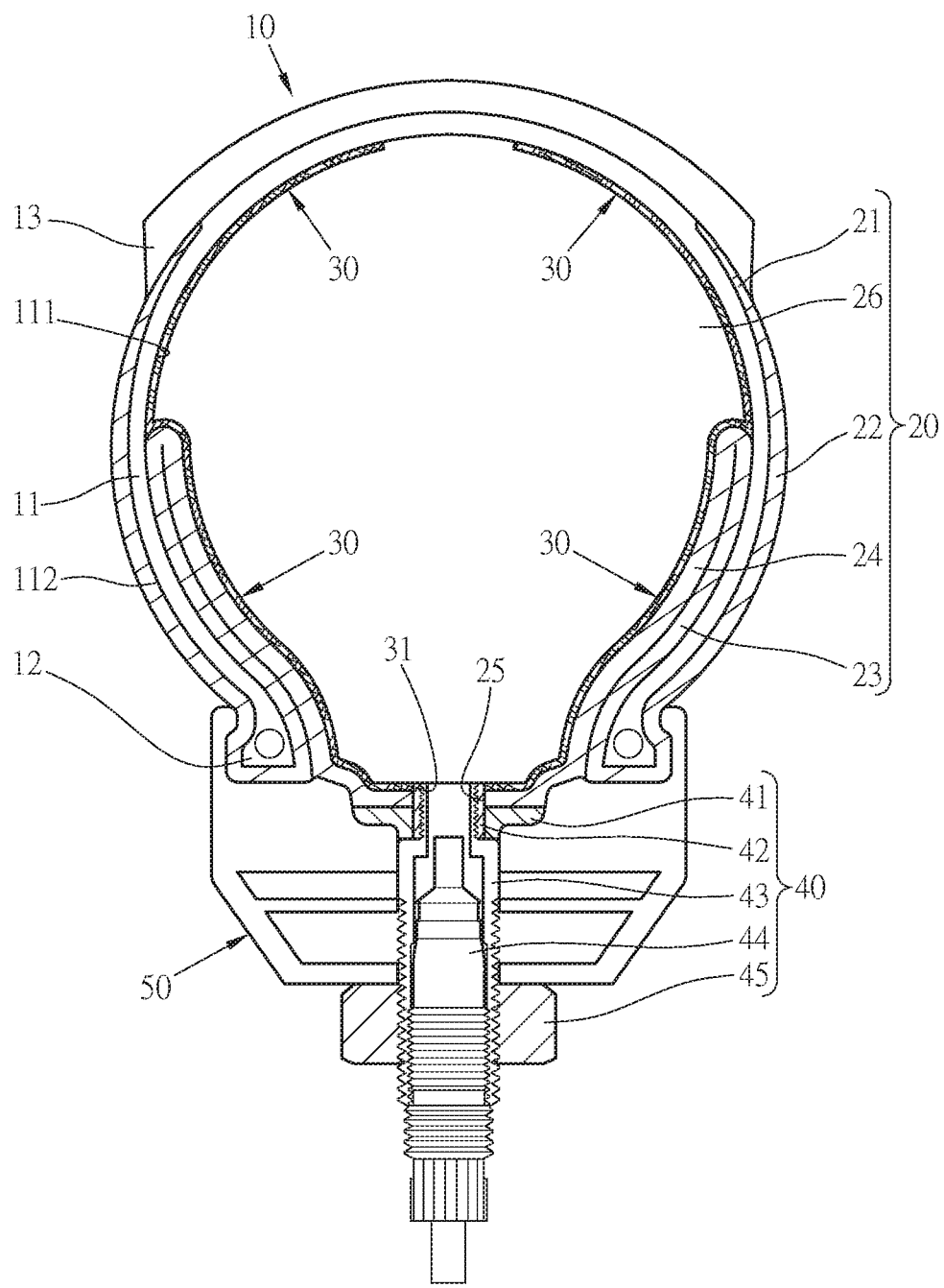
FIG. 10 is a schematic view of an assembly of an inflatable tubeless tire in accordance with a fourth preferred embodiment of the present invention.

With reference to FIG. 10 for a tire in accordance with the fourth preferred embodiment of this invention, the separator 30 is installed at two predetermined positions of the gas chamber 26 which are the left and right symmetrical inner surfaces 112. In addition, the separator 30 is disposed on the inner wall 241. The manufacturing method, assembling method, assembly and disassembly statuses and expected effects of this preferred embodiment are the same as those of the first preferred embodiment, except that the separator 30 of this preferred embodiment is installed on both left and right sides.

Figure 11:
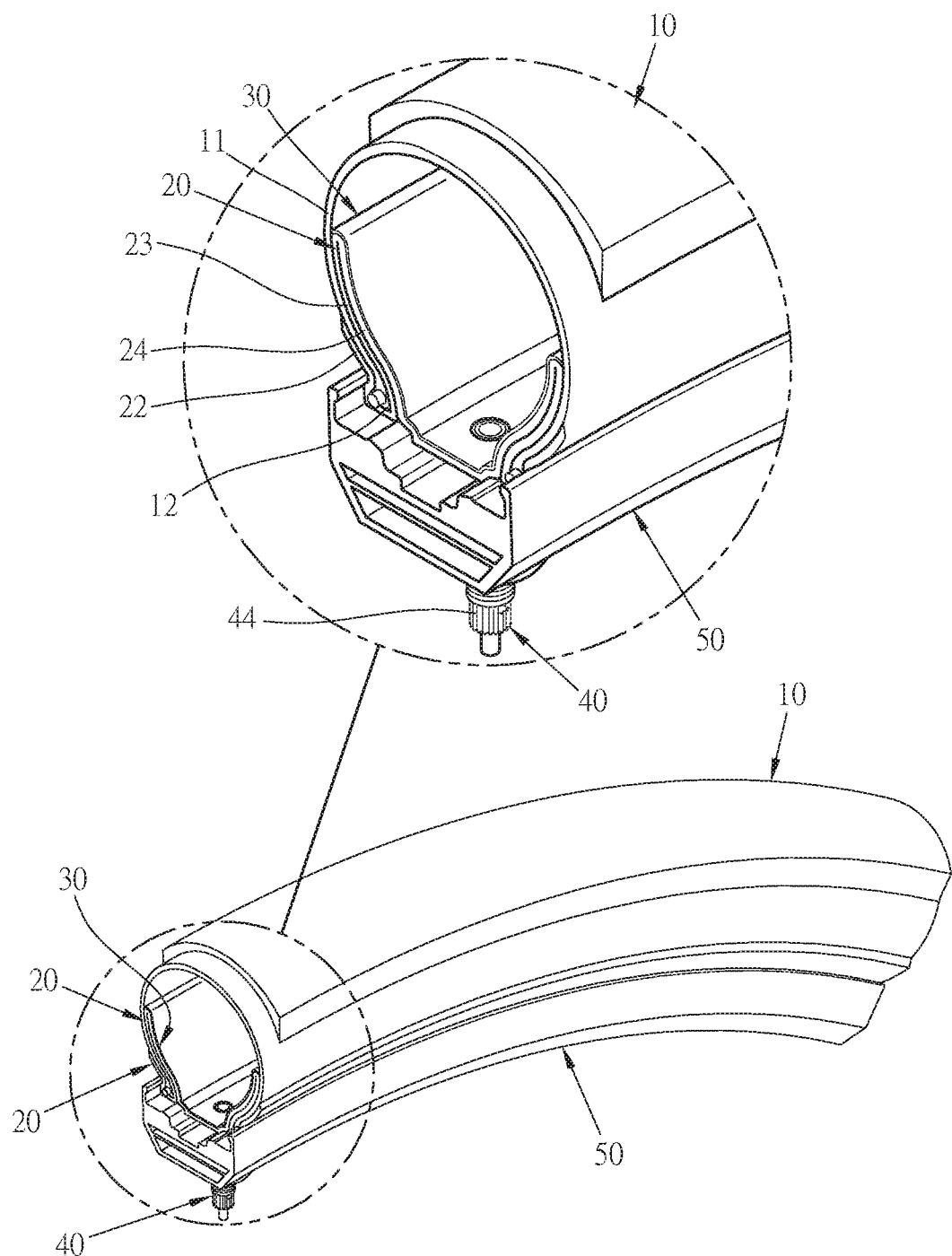
FIG. 11 is a perspective view of an assembly of an inflatable tubeless tire in accordance with a fifth preferred embodiment of the present invention.
Figure 12:
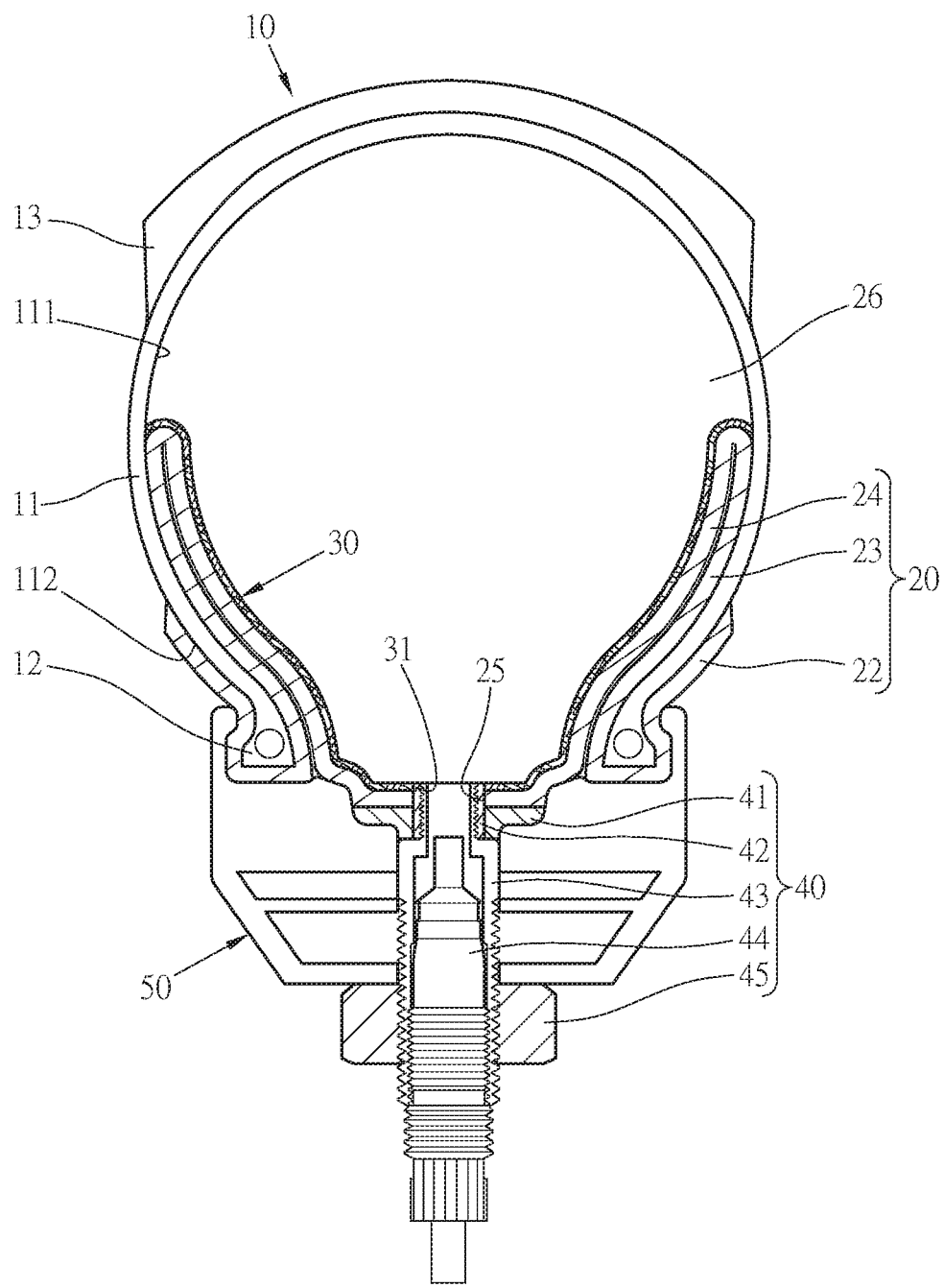
FIG. 12 is a schematic view of an assembly of an inflatable tubeless tire in accordance with a fifth preferred embodiment of the present invention.

With reference to FIGS. 11 to 12 for a tire in accordance with the fifth preferred embodiment of this invention, the cladding layer 20 has a continuously extended external covered portion 22 for covering a predetermined position of the outer surface 112 and extending to the bead 12. Similarly, the portion of both sides of the cladding layer 20 attached to the inner surface 111 is an internal covered portion 23, and the uncovered portion disposed in the carcass 11 is an elastic portion 24, and an opening 25 is formed at a predetermined position and penetrated through the elastic portion 24, and each inner surface 111 in the carcass 11 and the cladding layer 20 jointly form a gas chamber 26.

The manufacturing method, assembling method, assembly and disassembly statuses and expected effects of this preferred embodiment are the same as those of the first preferred embodiment, except that this embodiment omits the overlapped portion 21 of the first preferred embodiment and starts covering the cladding layer 20 from the lateral side of the carcass on the outer surface 112 to the inner surface 111 continuously, mainly reducing the area of the external covered portion 22 attached to the outer surface 112, so as to reduce the weight of the tire.

In summation of the description above, the inflatable tubeless tire of this invention uses a cladding layer covering an area to the interior of carcass, and then each cladding layer and the interior of the carcass form a sealed gas chamber. In addition, the installation of the separator on the inner wall of the gas chamber, and the structural design of each extending part and the screw enhance the air retention and durability significantly and improve the rigidity and support of the tire and the safety and service life. In addition, the invention is compatible with the commercially available rims and air valve parts. The tubeless tire of this invention is useful and cost-effective.

What is claimed is:

1. An inflatable tubeless tire, comprising:
   a carcass, with an U-shaped cross-section, and a bead disposed on a lower edge of both sides of the carcass respectively, an inner surface and an outer surface disposed at an interior and an exterior of the carcass respectively, and a tread disposed at a predetermined position of the outer surface of the carcass;
   a cladding layer, continuously covering an area from the outer surface to the inner surface, and having an overlapped portion disposed within a predetermined range of both ends of the cladding layer, and the overlapped portion being disposed between each carcass and the tread and continuously extending to form an external covered portion for covering an area from the outer surface to the bead, and the positions of both sides of the cladding layer covering the inner surface being an internal covered portion, and an uncovered position in the carcass being an elastic portion, and an opening being formed at a default position and penetrating through the elastic portion, and a gas chamber being jointly formed by each inner surface and a cladding layer inside the carcass;
   at least a separator, with a predetermined area partially disposed on a wall surface of the gas chamber, for separating corresponding surfaces of each elastic portion and the inner surface without sticking to one another, and the separator having a through hole configured to be corresponsive to the opening;
   an air valve module, passing between each of the opening and the through hole, and having a film fixed onto the elastic portion; an extending part, passing through each film, the opening and the through hole; a screw, with an end screwed into the extending part; and the screw having an air valve part therein; and a locking part, screwed to an exterior of the screw and then screwed and positioned to a rim after the screw passes through the rim.

2. An inflatable tubeless tire, comprising:
   a carcass, having a U-shaped cross-section, a bead disposed at a lower edge on both sides of the carcass respectively, an inner surface and an outer surface disposed at an interior and an exterior of the carcass respectively, and a tread disposed at a predetermined position of the outer surface;
   a cladding layer, covering an area from the outer surface to the inner surface continuously, and the cladding layer having a continuously extended external covered portion for covering an area from a predetermined position of the outer surface to the bead, and the portion of the inner surface covered by both sides of the cladding layer being an internal covered portion, and an uncovered portion inside the carcass being an elastic portion, and an opening being formed at a default position and penetrating through the elastic portion, and each inner surface inside the carcass and the cladding layer jointly forming a gas chamber;
   at least a separator, with a predetermined area partially disposed on a wall surface of the gas chamber, for isolating surfaces of each of the elastic portion and the inner surface without sticking to each other, and the separator having a through hole configured to be corresponsive to the opening;

an air valve module, passing between each of the opening and the through hole, and having a film fixed to the elastic portion; an extending part, passing through each film, the opening and the through hole; a screw, with an end screwed into the extending part; and the screw having an air valve part therein; a locking part, screwed to an exterior of the screw, and screwed and positioned to a rim after the screw passes through the rim.

3. The inflatable tubeless tire of claim 1 or 2, wherein the separator is one selected from the group consisting of a single-piece spacer, a multiple-piece spacer, an isolation liquid and an isolation powder.

4. The inflatable tubeless tire of claim 1 or 2, wherein the separator is installed on a wall surface of the gas chamber by fixing, coating, or both of the fixing and coating.

5. The inflatable tubeless tire of claim 1 or 2, wherein the elastic portion has an inner wall facing an edge surface of the gas chamber; an outer wall disposed on another side of the elastic portion; and the separator is installed on the inner wall.

6. The inflatable tubeless tire of claim 5, wherein the separator is disposed on the elastic portion, the inner surface, or simultaneously installed onto each elastic portion and each inner surface.

7. The inflatable tubeless tire of claim 1 or 2, wherein the separator is sheet-shaped and made of a material selected from the group consisting of vinyl chloride, polyethylene terephthalate, acrylonitrile butadiene styrene, polyethylene, polypropylene, low-density styrene, polystyrene, polyethylene terephthalate, polyamide, polyoxymethylene, polycarbonate, polyphenylene ether, ethylene vinyl acetate, polyimide, polyphenylene sulfide, and polytetrafluoroethylene.

8. The inflatable tubeless tire of claim 1 or 2, wherein the separator is in a powder form, and made of a material selected from the group consisting of silicone and magnesium oxide.

9. The inflatable tubeless tire of claim 1 or 2, wherein the separator is in a liquid form which is a silicone-containing solvent.

10. The inflatable tubeless tire of claim 1 or 2, wherein the separator has an arc length greater than or equal to $\frac{1}{5}$ of an arc length of the inner surface of the carcass.

11. The inflatable tubeless tire of claim 1 or 2, wherein the separator has an arc length smaller than or equal to 1.5 times of the arc length of the inner surface of the carcass.

12. The inflatable tubeless tire of claim 1 or 2, wherein the cladding layer is a high-strength carcass layer; the extending part is in a hollow tubular shape having a screw thread therein; and an end of the screw is screwed into the screw thread; and the extending part has a length value falling within a range of 2 mm~15 mm.

* * * * *